United States Patent

Sato

(10) Patent No.: US 7,390,576 B2
(45) Date of Patent: *Jun. 24, 2008

(54) MAGNETIC METAL PARTICLE AGGREGATE AND METHOD OF PRODUCING THE SAME

(75) Inventor: Kimitaka Sato, Saitama-ken (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 231 days.

This patent is subject to a terminal disclaimer.

(21) Appl. No.: 10/898,287

(22) Filed: Jul. 26, 2004

(65) Prior Publication Data

US 2005/0022910 A1 Feb. 3, 2005

(30) Foreign Application Priority Data

Jul. 30, 2003 (JP) ............................. 2003-282657

(51) Int. Cl.
*B32B 5/16* (2006.01)
*B22F 1/02* (2006.01)

(52) U.S. Cl. .................. 428/546; 428/570; 428/687

(58) Field of Classification Search ................. 428/402, 428/546, 570, 687
See application file for complete search history.

(56) References Cited

U.S. PATENT DOCUMENTS

| | | | | |
|---|---|---|---|---|
| 5,124,060 | A * | 6/1992 | Yokouchi et al. | 252/62.51 R |
| 5,382,373 | A * | 1/1995 | Carlson et al. | 252/62.55 |
| 6,254,662 | B1 * | 7/2001 | Murray et al. | 75/348 |
| 6,331,364 | B1 * | 12/2001 | Baglin et al. | 428/694 T |
| 6,777,078 | B2 * | 8/2004 | Maeda et al. | 428/336 |
| 6,838,195 | B2 * | 1/2005 | Weller et al. | 428/694 TM |
| 2005/0051241 | A1 * | 3/2005 | Tohji | 148/306 |

FOREIGN PATENT DOCUMENTS

JP 3258295 12/2001

OTHER PUBLICATIONS

S. Liou, "Magnetic Properties of Iron and Iron Platinum Alloys Synthesized Via Microemulsion Techniques", Journal of Applied Physics vol. 87, No. 9, pp. 5615-5617.
D. Zairyo, "Electronic Materials", Jan. 2002, pp. 61-67.
B. Jeyadevan, "Direct Synthesis of fct-FePt Nanoparticles by Chemical Route", Journal of Applied Physics vol. 42 (2003), L350-L352.

* cited by examiner

*Primary Examiner*—H. Thi Le
(74) *Attorney, Agent, or Firm*—Clark & Brody

(57) ABSTRACT

A method to produce dispersion of magnetic metal particle aggregates is provided. FePt nanoparticles are uniformly dispersed with the particles separated at controlled inter-particle spacing. The magnetic metal particle aggregate is composed of magnetic metal particles whose main components and the contents thereof are represented by the following general formula (1):

$$[T_X M_{1-X}]_Y Z_{1-Y}, \quad (1)$$

where
T is one or both of Fe and Co,
M is one or both of Pt and Pd,
Z is at least one member selected from the group composed of Ag, Cu, Bi, Sb, Pb and Sn,
X represents 0.3~0.7, and
Y represents 0.7~1.0,
the balance being impurities unavoidably incorporated during production,
wherein
the proportion of face-centered tetragonal structure is in the range of 10~100%,
the particles have an average diameter of 30 nm or less, and
the particles are in a dispersed state spaced apart from one another.

10 Claims, 2 Drawing Sheets

MAGNETIC METAL PARTICLE AGGREGATE AND METHOD OF PRODUCING THE SAME

BACKGROUND OF THE INVENTION

1. Field of the Invention

This invention relates to a magnetic metal particle aggregate whose particles contain Fe and Pt as alloying elements which can be used in high-density magnetic recording media, nanoscale electronic devices, permanent magnet materials, biomolecular labeling agents, drug carriers and the like, and to a method of producing the magnetic metal particle aggregate.

2. Background Art

In order to increase the recording density of a high-density magnetic recording medium, it is necessary to reduce the bit size, which is the basic unit for recording. However, conventional media using sputter-formed films are approaching the recording density limit because of problems in areas such as thermal fluctuation, particle refinement and variance of particle size. Recently, therefore, attention has been focused on FePt-based magnetic metal nanoparticles that posses high anisotropy, exhibits strong coercivity and resists thermal fluctuation as a candidate for high-density magnetic recording medium.

Japanese Patent No. 3258295 (JPA-No. 2000-54012; herein after called Reference 1) discloses a method to synthesize such magnetic metal nanoparticles, namely a method for the synthesis of monodispersed FePt alloy particles by thermally decomposing iron pentacarbonyl and reducing platinum (II) acetylacetonate by polyol, simultaneously. On the other hand, in the Journal of Applied Physics, Vol. 87, No. 9, 1 May 2000, p.5615-5617 (Reference 2), a method of reducing metal ions using boron hydride is reported. Here, the reaction site is a water/oil type reversed micelle utilizing an octane oil phase and CTAB (cetyl trimethyl ammonium bromide) as a surfactant.

The nanometer size FePt particles obtained by these methods has a disordered fcc (face-centered cubic) crystal structure, and exhibit superparamagnetism at room temperature. These particles could be made ferromagnetic by heat-treating the same and transforming the crystal structure to an $L1_0$ ordered fct (face-centered tetragonal) type.

The heat treatment has to be conducted at or above the crystal structure transition (disordered to ordered phase) temperature ($T_t$), which is 500° C. or higher. During heat treatment, the particle size distribution broadens owing to particle growth caused by heat-induced coalescence among the particles. As a result, the particles consist of a mixture of single and multi-domain structures that makes them unsuitable for a high-density magnetic recording media. Therefore, in order to obtain FePt particles having ferromagnetism while maintaining their particle diameter immediately after synthesis, it is effective to coat the particles with a protective agent for preventing inter-particle coalescence or to lower $T_t$ by some method so that the heat treatment can be conducted at lower temperature.

Denshi Zairyo (Electronic Materials) January 2002, p61-67 (Reference 3) reports that the addition of third elements such as Ag, Cu, Sb, Bi and Pb during synthesis of FePt particles by the polyol process makes it possible to reduce the crystal structure transition (from fcc to fct structure) temperature ($T_t$). However, the iron source used was iron (III) acetylacetonate, and not iron pentacarbonyl. Another research article appeared in Jpn. J. Appl. Phys. Vol. 42 (2003) Part 2, No. 4A, L350-L352 (Reference 4) reported on the use of polyol process for the direct synthesis of fct-FePt particles. The researchers synthesized FePt particles by heating a solution of Fe (acac)$_3$ and Pt (acac)$_2$ in tetraethylene glycol under stirring and refluxing at different temperatures up to the boiling point. They found that the products synthesized at reaction temperatures above 280° C. exhibited XRD peaks of 001 and 110 lattice planes corresponding to fct-FePt and concluded that the FePt particles including fct structure can be directly synthesized from liquid phase. However, the transmission electron micrographs of the FePt particles suggested that the particles were not in a dispersed state but were coalesced.

SUMMARY OF THE INVENTION

When FePt nanoparticles of the type discussed in the foregoing are used in high-density magnetic recording media, nanoscale electronic devices, permanent magnet materials, biomolecular labeling agents, drug carriers and the like, a processing technique is necessary to assemble the FePt nanoparticles with specific magnetic characteristics on a substrate or base at prescribed inter-particle spacing in either one, two or three dimensions. When some auxiliary function is to be imparted, an additional process to coat the particles with some substance, a reagent for example, becomes necessary. Such operations are best conducted with FePt nanoparticles dispersions; where particles are separated from each other and retain a prescribed inter-particle distance.

However, the methods described in References 1-3 cannot readily produce fct-FePt nanoparticle dispersion because the particles have to be subjected to heat treatment at 500° C. or higher in order to obtain the fct structure. On the other hand, the synthesis method described in Reference 4 is very likely to be capable of directly synthesizing fct-FePt particles but, as can be seen from the transmission electron micrographs in the paper, the particles were strongly agglomerated and were not successfully dispersed. This is attributed to the particle production history.

Thus, it has not been possible to obtain an FePt nanoparticle-system aggregate that has desired magnetic characteristics and is in a dispersed, flow-enabling state with the particles in positions separated at prescribed spacing. An object of the present invention is therefore to provide such an aggregate.

The inventor succeeded in obtaining an aggregate of nanoparticles including fct structure whose particles are dispersed with a prescribed inter-particle distance.

Specifically, I accomplished the present invention, which provides a magnetic metal particle aggregate composed of magnetic metal particles whose main components and the contents thereof are represented by the following general formula (1):

$$[T_X M_{1-X}]_Y Z_{1-Y} \quad (1),$$

where

T is one or both of Fe and Co,

M is one or both of Pt and Pd,

Z is at least one member selected from the group composed of Ag, Cu, Bi, Sb, Pb and Sn, X represents 0.3~0.7, and Y represents 0.7~1.0, the balance being impurities unavoidably incorporated during production, wherein the proportion of the fct structure is in the range of 10~100%, the particles which were estimated to have an average diameter of 30 nm or less preferably of 10 nm or less from transmission electron microscopic observation (TEM), are in the dispersed state, spaced apart from one another, preferably by an inter-particle distance of 1 nm or greater.

The magnetic metal particle aggregate in accordance with the present invention can exist in a state having overall fluidity or can exist in a state with the individual particles located at prescribed positions (fixed).

The magnetic metal particle aggregate (assembly) of this invention can be obtained by a method comprising the following step:

a step of preparing a composite obtained by intermixing magnetic metal particles (P) whose main components and the contents thereof are represented by the general formula $[T_xM_{1-x}]_YZ_{1-Y}$, where T is one or both of Fe and Co, M is one or both of Pt and Pd, Z is at least one member selected from the group composed of Ag, Cu, Bi, Sb, Pb and Sn, X represents 0.3~0.7, and Y represents 0.7~1.0, the balance being impurities unavoidably incorporated during production, wherein the proportion of the face-centered tetragonal structure is in the range of 10~100% and the particles have an average diameter of 30 nm or less a liquid organic medium (A) and a liquid organic medium (B) that phase-separate and are immiscible each other, and an organic medium (C) serving as a surface-active agent;

a step of mechanically stirring or shaking this composite to form a suspension wherein surface-coated particles (CP) coated with the organic medium (C) on the surfaces are suspended;

a step allowing to stand or centrifuging the suspension to separate phase A, which consists mainly of organic medium (A) and relatively small amount of suspended coated particles (CP), and phase B, which consists mainly of organic medium (B) and has a relatively large amount of suspended coated particles (CP);

a step of recovering phase B from the so-separated state; and a step of evaporating off a desired amount of organic medium (B) from the recovered phase B.

This method is enable to make the magnetic metal particle aggregates in which the particles are in a dispersed state spaced apart from one another.

The aforesaid liquid organic medium (A) may be an alcoholic liquid and the liquid organic medium (B) may be an organic liquid whose water solubility is less than 1 wt. % and boiling point is less than 200° C., preferably less than 100° C. Especially, the liquid organic medium (A) can be a post-reaction liquid obtained when FePt nanoparticles having fct structure as a part or all are directly synthesized by the polyol process.

The aforesaid dispersion can be achieved by coating the particle with a surface-active agent. The magnetic metal particles are preferably dispersed in a liquid medium at an inter-particle distance of 1 nm or greater, the concentration of the magnetic metal particles in the dispersion is preferably not less than $1.0 \times 10^{-5}$ vol. % and not greater than 40 vol. %. The average particle diameter of the magnetic metal particles by the dynamic light scattering method is 30 nm or less, preferably 10 nm or less. The dispersion medium at this time is preferably constituted from the organic liquid (B) whose water solubility is less than 1 wt. % and boiling point is less than 200° C., and a surface active agent composed of an organic medium (C) whose molecule includes at least one radical selected from the group consisting of an amine, amide, azo, carboxyl, sulfone, sulfine, phosphone, phosphine, carboxylate, phosphonate, phosphinate, sulfonate, sulfinate or thiol radical.

Here, the particles can be distributed on the surface of a substrate in a single layer or multiple layers in a state spaced from one another by 1 nm or greater.

BRIEF DESCRIPITON OF THE DRAWINGS

DESCRIPTION OF THE PREFERRED EMBODIMENTS

Figure 1:
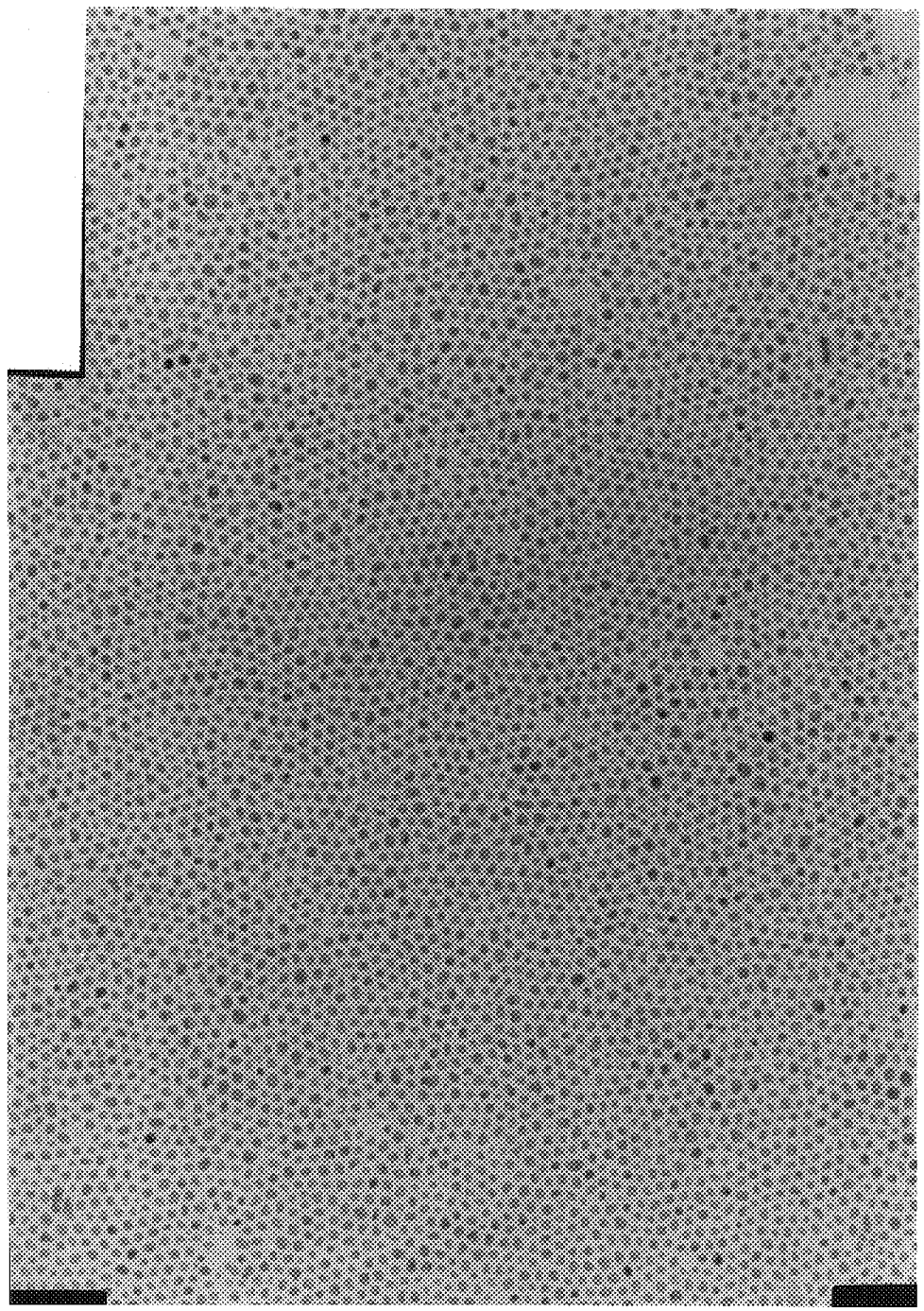
FIG. 1 shows a transmission electron micrograph (×300,000) of an FePt nanoparticle aggregate according to an example of the present invention.

FIG. 1 is an example of magnetic metal particle aggregate according to the present invention. Specifically, FIG. 1 is the transmission electron micrograph (×300,000) of FePt particle aggregate obtained in Example 1 set out later in this specification. As can be seen at a glance, the aggregate is composed of particles of substantially equal diameter that are uniformly dispersed with constant inter-particle spacing. This micrograph was taken with JEM-100CX II Transmission Electron Microscope (product of JEOL) at an acceleration voltage of 100 kV. The observed sample was prepared by dripping the dispersion containing FePt particles onto a carbon coated Cu 150 mesh. The excess liquid was removed by using a filter paper (dripping and removal of excess liquid were repeated) and the mesh was dried naturally. As explained in more detail in Example 1, the proportion of face-centered tetragonal structure (proportion accounted for by $L1_0$ orderly phase constituting the fct structure) of the FePt particle aggregate was 52%. The particles had an average particle diameter of 5.2 nm, a standard deviation of 1.0 nm, a geometrical average particle diameter of 5.1 nm and a geometrical standard deviation of 1.2 nm.

Production of FePt nanoparticles including fct structure without heat treatment is suggested by Reference 4, for example. However, the FePt nanoparticles including fct structure reported in Reference 4 are not monodispersed. In contrast, the FePt nanoparticles including fct structure according to the present invention are obtained in the form of an aggregate whose particles are uniformly dispersed at substantially even intervals. In the example shown in FIG. 1, the average inter-particle distance between particles is 3.3 nm as determined in accordance with Equation (B) set out in detail later. The particles are configured to spread out two-dimensionally with this inter-particle spacing so as to form a single layer on a substrate (specimen stage). The reason why the particles assume constant spacing in this manner can be considered to be because of the presence of a steric hindrance between the particles (in the illustrated case, adherence between particles is hindered by an inter-particle repulsive action owing to the presence of surface active agent).

When the particles are immobilized on a substrate in a dispersed condition as shown in FIG. 1, they can, in that form, constitute a high-density magnetic recording medium, nanoscale electronic device, permanent magnet material, biomolecular labeling agent or drug carrier. Immobilization of the particles can be achieved by using a resinous, vitreous, ceramic or other insulating material and make them adhere at their respective locations. Coating and vapor depositing can be mentioned as ways of using the adhesive material to fix the particles. The adhesion can also be done using a coupling agent capable of chemically bonding inorganic and organic materials, such as a silane-coupling agent. In such a case, the particles can be uniformly distributed on the substrate to form a monolayer, as shown in FIG. 1, or, if required, multiple layers.

When the particles are fixed using a coupling agent, which can be represented by a general formula R'M(OR)$_3$, where R' represents the organofunctional radical such as vinyl radical, epoxy radical, styryl radical, methacryl radical, amino radical, mercapto radical, chloropropyl radical, and the likes, OR represents a hydrolytic alkoxy radical or alkyl radical bound to M (Si, Ti, Zr, Al etc.). The alkoxide radical in the structure of these coupling agents reacts with the OH radical on an inorganic material surface, while the organofunctional radical chemically reacts with various organic materials. When the organofunctional radical includes, but not limited to a radical that can form a coordinate bond with a metal, namely an amine, amide, azo, carboxyl, sulfone, sulfine, phosphone, phosphine, carboxylate, phosphonate, phosphinate, sulfonate, sulfinate or thiol radical, the organofunctional radical can form a coordinate bond with an inorganic surface. These properties can therefore be utilized to fix the invention FePt nanoparticles on a substrate. If a desired oxide layer or organic layer pattern is formed on the substrate, for instance, the properties of the coupling agent enable selective configuration of the magnetic nanoparticles on the pattern only. The properties of the coupling agent can also be used to attach nanoparticles on the surfaces of specific particles with diameter larger than the FePt nanoparticles, thereby enabling to be used as biomolecular labeling agents and drug carriers. Moreover, by attaching magnetic nanoparticles to uniform spherical particles of large particle diameter (e.g., organic particles of polystyrene or inorganic particles of SiO$_2$), it is possible to create nanoscale electronic devices with new capabilities that have not been achieved up to now. Although nanoscale order magnetic metal particles pose durability problems, this can be overcome by coating the magnetic nanoparticles with a layer of M oxide (M being that in the foregoing equation).

Another attachment method that can be used to selectively configure the magnetic nanoparticles on a substrate or base is to form an insulating material pattern on a substrate or base made of an electrically conductive material and then apply a voltage to the conductive material. In order to selectively configure the nanoparticles on such a substrate or base, however, it is essential for the magnetic nanoparticles to be in a non-joined state dispersed at a prescribed inter-particle distance and to possess overall fluidity. The magnetic metal particle aggregate of the present invention satisfies these requirements apparently.

The particulars defined by the present invention will now be explained.

Metal Components and their Contents

The main components of the magnetic metal particles of the present invention, and the contents thereof, are represented by the following general formula (1):

$$[T_X M_{1-X}]_Y Z_{1-Y} \qquad (1),$$

where, T is one or both of Fe and Co, M is one or both of Pt and Pd, Z is at least one member selected from the group composed of Ag, Cu, Bi, Sb, Pb and Sn. T and M are typically Fe and Pt. Although X=0.5 is ideal for forming a face-centered tetragonal structure, a 10~100% face-centered tetragonal structure can be obtained in the range of X of 0.3~0.7. Although the Z component can lower the crystal structure transition temperature (Tt) from fcc to fct structure in the case of synthesizing FePt particles by the polyol method, it need not be contained in some cases. Specifically, the optimum value of Y, although differing depending on the type of Z, falls in the range of 0.7~1.0. A value of less than 0.7 for Y is undesirable because the resulting presence of excessive Z sharply depresses magnetic characteristics by hindering the emergence of fct structure. Analysis of the composition of the magnetic metal particles according to the present invention can be carried out by EDX (energy dispersive X-ray) measurement. Although the magnetic metal powder is ideally made up of metal particles having the composition represented by Equation (1), presence of impurities unavoidably incorporated in the course of production can be tolerated.

From that has been explained in the foregoing, the composition of the magnetic metal particles according to the present invention is typically FePt, the ensuing explanation will be made using FePt particles as an example. In this specification, the term "FePt particles" is, by definition, to be construed as referring to magnetic metal particles represented by Equation (1).

Fraction of Face-Centered Tetragonal Structure

When the volumetric ratio (vol. %) of the fct structure of the FePt particles is less than 10 vol. %, the magnetic anisotropy is small and the coercivity and thermal stability required by a magnetic recording material cannot be obtained. When the magnetic anisotropy is too large, the resulting excessively high coercivity may make the product difficult to use as a material for a magnetic recording medium and rather make it suitable for strong permanent magnets. The ratio of the face-centered tetragonal (fct) structure of the invention magnetic metal particles is therefore defined as 10~100%, preferably 20~100%, more preferably 55~100%.

The crystal structure of the FePt particles can be ascertained by analyzing the volumetric ratio of the ferromagnetic structure determined by Mossbauer spectroscopy measurement of Fe atoms. The breakdown of different crystal structures is generally determined by comparing X-ray diffraction peak intensities. However, it is difficult to quantify the crystal structures of the invented FePt particles from these peaks, because the X-ray diffraction patterns of the fcc structure and the fct structure are nearly identical and the intensities of the (001) and (110) reflections obtained only from the fct structure are very weak. In the present invention, therefore, the volumetric fraction of the fct structure of the FePt particles is determined by calculating the fraction of magnetically ordered Fe atoms determined by Mossbauer spectroscopy measurement, and the so-obtained ratio is defined as the volumetric fraction of the fct structure.

Particle Diameter, Particle Size Distribution and Inter-Particle Interval

The magnetic metal particle aggregate according to the present invention has an average particle diameter by transmission electron microscopic observation (TEM) of 30 nm or less, preferably 10 nm or less. The aggregate is in a monodispersed state with the individual particles spaced apart, preferable at an inter-particle interval of 1 nm or greater. The particle diameter, particle size distribution and inter-particle interval of the particles can be evaluated by TEM observation, and the particle size distribution thereof in a liquid can be evaluated by the dynamic light scattering method. Since measurement by the dynamic light scattering method is not possible when the particle concentration is low, it is necessary in such a case to first carry out an operation for increasing the concentration such as by evaporating the solvent. The FPAR1000 Fiber-Optics Particle Analyzer manufactured by Otsuka Electronics Co., Ltd. is one of a number of dynamic light scattering-type particle distribution measuring units available.

The inter-particle interval is defined as follows in the case where the particles are dispersed in a single layer with two-dimensional spread. A region including 500 or more particles is selected from a transmission electron micrograph of the particles. The area of the region is calculated and defined as S and the number of particles therein is counted and defined as N. The average particle diameter of the region is designated as r. The area occupied by a single particle represented by a square measuring R nm per side is given by Equation (A):

$$S/N=R^2 \qquad (A)$$

The average inter-particle spacing D, is defined by Equation (B):

$$D=R-r=\sqrt{(S/N)}-r \qquad (B)$$

The inter-particle interval depends on the steric repulsion (steric huderance) between the particles. When the steric repulsion between the particles is dependent on a surface active agent adsorb to the particle surfaces, the inter-particle interval can be adjusted between 1 nm and 100 nm depending on the type of surface-active agent. In the case where the particles are suspended in a liquid, the inter-particle interval can be increased starting from the smallest value of the aforesaid inter-particle interval as the lower limit by reducing the particle concentration.

Magnetic Characteristics

The magnetic metal particle agragate according to the present invention has an onset temperature (crystal structure transition starting temperature from fcc to fct) of 400° C. or lower, saturation magnetization σs of 5 $Am^2$/kg -96.16 $Am^2$/kg and coercivity Hc of 79 kA/m-3820 kA/m. The magnetic characteristics (Hc, σs) can be measured with a SQUID magnetometer or a vibrating sample magnetometer (VSM), depending on the type of specimen.

Production Method

The method of producing the aggregate composed of dispersed magnetic metal particles in accordance with the invention will now be explained.

Immiscible liquid organic mediums (A) and (B) and an appropriate surface-active agent (C) are prepared. The liquid organic medium (A) is an alcoholic liquid, and the liquid organic medium (B) is a liquid whose water solubility is less than 1 wt. % and boiling point is lower than 200° C., preferably lower than 100° C. An organic medium (C) serving as a surface-active agent (dispersant) is also prepared. A specific example of the organic medium (A) is a post-reaction liquid obtained when FePt nanoparticles including fct structuer are directly synthesized by polyol process.

In a first method, the organic medium A and a mass of FePt nanoparticles (P) are combined to prepare a liquid (A+P), and the organic medium (C) constituting the surface active agent is added to the organic medium (B) to prepare a liquid (B+C). The liquid (A+P) and the liquid (B+C) are mixed and forcibly stirred (or shaken) to form particles (CP) composed of the particles (P) surface-coated with the organic medium (C). The resulting mixture is left to stand or centrifuged to phase-separate it into a phase (phase A) which consists mainly of organic medium (A) and has a relatively small amount of suspended particles (CP) and a phase (phase B) which consists mainly of organic medium (B) and has a relatively large amount of suspended particles (CP). The phase A is removed to recover the phase B. The recovered phase B contains the particles P in a state coated to a certain thickness with the surface active agent C. As a result, the particles experience an inter-particle repulsive action owing to the effect of the affinity towards the medium and an electrostatic repulsive force and are therefore dispersed in the liquid B by the inter-particle repulsive action. By evaporating off the liquid B, there is, under ideal circumstances, obtained a magnetic metal particle aggregate whose particles are dispersed in a state prevented from joining together by the surface active agent C acting as a steric hindrance so as to be spaced apart by a distance determined by the thickness of the layer of the surface active agent C on the surfaces of the individual particles. The suspension having the particles dispersed in the liquid under the inter-particle repulsive action can be restored by again adding this aggregate to the liquid B.

In a second method, an coherent mass of FePt nanoparticles (P) and the organic medium (C) constituting the surface active agent are added to the organic medium A to prepare a liquid (A+P+C). The organic medium (C) constituting the surface active agent is also added to the organic medium B to prepare a liquid (B+C). The liquid (A+P+C) and the liquid (B+C) are mixed and forcibly stirred (or shaken) to form particles (CP) composed of the particles (P) surface-coated with the organic medium (C). The resulting mixture is left to stand or centrifuged to phase-separate it into a phase (phase A) which consists mainly of organic medium (A) and has a relatively small amount of suspended particles (CP) and a phase (phase B) which consists mainly of organic medium (B) and has a relatively large amount of suspended particles (CP). The phase A is removed to recover the phase B. The recovered phase B contains the particles P in a state coated to a certain thickness with the surface active agent C. As a result, the particles experience an inter-particle repulsive action owing to the effect of the affinity towards the medium and an electrostatic repulsive force and are therefore dispersed in the liquid B by the inter-particle repulsive action. By evaporating off the liquid B, there is, under ideal circumstances, obtained a magnetic metal particle aggregate whose particles are dispersed in a state prevented from joining together by the surface active agent C acting as a steric hindrance so as to be spaced apart by a distance determined by the thickness of the layer of the surface active agent C on the surfaces of the individual particles. The suspension having the particles dispersed in the liquid under the inter-particle repulsive action can be restored by again adding this aggregate to the B liquid.

In a third method, a coherent mass of FePt nanoparticles (P) and the organic medium (C) constituting the surface active agent are added to the organic medium A to prepare a liquid (A+P+C). The organic medium B is prepared. The liquid (A+P+C) and the liquid (B) are mixed and forcibly stirred (or shaken) to form particles (CP) composed of the particles (P) surface-coated with the organic medium (C). The resulting mixture is left to stand or centrifuged to phase-separate it into a phase (phase A) which consists mainly of organic medium (A) and has a relatively small amount of suspended particles (CP) and a phase (phase B) which consists mainly of organic medium (B) and has a relatively large amount of suspended particles (CP). The phase A is removed to recover the phase B. The recovered phase B contains the particles P in a state coated to a certain thickness with the surface active agent C. As a result, the particles experience an inter-particle repulsive action owing to the effect of the affinity towards medium and an electrostatic repulsive force and are therefore dispersed in the liquid B by the inter-particle repulsive action. By evaporating off the liquid B, there is, under ideal circumstances, obtained a magnetic metal particle aggregate whose particles are dispersed in a state prevented from joining together by the surface active agent C acting as a steric hindrance so as to be spaced apart by a distance determined by the thickness of the layer of the surface active agent C on the surfaces of the individual particles. The suspension having the particles dispersed in the liquid under the inter-particle repulsive action can be restored by again adding this aggregate to the B liquid.

Thus the first, second and third methods are production methods common in the points of:

preparing a composite obtained by intermixing a mass of magnetic metal particles (P), a liquid organic medium (A) and a liquid organic medium (B) that phase-separate and are immiscible each other, and an organic medium (C) serving as a surface active agent;

forcibly stirring or shaking this composite to form a suspension wherein particles (CP) composed of the particles (P) surface-coated with the organic medium (C) are suspended;

leaving to stand or centrifuging the suspension to phase-separate it into a phase (phase A) which consists mainly of organic medium (A) and has a relatively small amount of suspended particles (CP) and a phase (phase B) which consists mainly of organic medium (B) and has a relatively large amount of suspended particles (CP);

recovering the phase B from the so-separated phases; and evaporating off a desired amount of organic medium (B) from the recovered phase B, thereby obtaining a magnetic metal particle aggregate of dispersed, spaced-apart magnetic metal particles.

Even when the obtained magnetic metal particle aggregate has been substantially completely removed the organic medium (B) by drying (in which case the particles are spaced apart by a distance determined by the thickness of the layer of the surface active agent C on the surfaces of the individual particles), it is nevertheless possible to restore the B-phase suspension having the particles dispersed in the liquid under the inter-particle repulsive action by adding the aggregate to the liquid B.

In addition, the following refining method is preferably used to reduce the impurity content of the phase B obtained by the production method.

Refining Method

Water and/or alcohol is added to the phase B obtained by the foregoing production method, the obtained composite is forcibly stirred or shaken, and the resulting mixture is left to stand and/or centrifuged to phase-separate it into a phase (W) composed mainly of water/and or alcohol and having a relatively small amount of the particle (CP) suspension and a phase (B') composed mainly of organic medium (B) and having a relatively large amount of the particle (CP) suspension. A phase B' is recovered from the so-separated phases and the obtained phase B' is dried as required by removing a desired amount of organic medium (B) therefrom. As this process transfers impurities to the phase W, a phase B' of low impurity concentration can be obtained by extracting the phase W to outside the system.

Organic Mediums A, B and C

The organic medium A and organic medium B used in the present invention phase-separate. The organic medium A can be a post-reaction liquid obtained when FePt nanoparticles including fct structure are directly synthesized by a polyol process. In this case, a mass of FePt nanoparticles are present in the post-reaction liquid. The post-reaction liquid generally contains various constituents. The inventor measured the loss on heating of such a post-reaction liquid using a thermogravimetric and differential thermal analyzer (TG-DTA) and found that about 20% remained even when the temperature was increased to 400° C. A solution containing components with such a high boiling point is not easy to deal with. Moreover, if it contains a large amount of metal ions and other impurities, it is particularly difficult to use in high-density magnetic recording media, nanoscale electronic devices, permanent magnet materials, biomolecular labeling agents, drug carriers and the like. However, this type of post-reaction liquid can be advantageously used in the production method of this invention, because the amount of such high-boiling-point impurities, metal ions and the like transferred to the phase B side is small.

When such an (alcoholic) organic liquid is used as the organic medium A, another organic medium B should have less than 1 wt. % water solubility and boiling point of lower than 200° C. The usable functional organic medium B includes, but not limited to hexane, cyclohexane, benzene, toluene, xylene, chloroform. The organic medium B is easy to dry by heating and/or pressure reduction. The impurities present in the medium B should be washed with water.

In the refinement of the obtained phase B, it is also possible to use an alcohol (which will phase-separate from the organic medium B) either with water or alone. Even if the alcohol dissolves in the phase B, it can be easily removed by fractional distillation.

The organic medium C in the present invention is a surface active agent. Preferable surface active agents for use in the present invention include ones consisting of an organic compound whose molecule includes an amine radical, amide radical or azo radical having an N atom that readily adheres to the metal particle surface, polyvinyl pyrrolidone, and organic compounds with sulfone, sulfine, phosphone, phosphine, carboxylate, phosphonate, phosphinate, sulfonate, sulfinate, thiol or carboxyl radical.

The mass concentration of impurities present in the phase B (or phase B') can be ascertained by calculating the total mass concentration of the organic medium (B), particles (CP) and organic medium (C) contained in the phase and then calculating the balance not accounted for. The mass concentration of the organic medium (B), which has a boiling point of lower than 200° C., can be found from the decrease in mass by drying, that of the particles (CP) can be found by inductively coupled plasma-atomic emission spectrometry (ICP-AES) and that of the organic medium C can be ascertained by the analytical curve method using liquid chromatography or gas chromatography. An impurity mass concentration exceeding 1 wt % is undesirable because it makes control of the dispersion liquid physical properties difficult and also becomes of cause of product and/or production equipment fouling.

Working examples of the present invention will now be set out.

EXAMPLES

Example 1

Iron (III) acetylacetonate and platinum (II) acetylacetonate were added to 100 ml of tetraethylene glycol in an amount of 0.13 mmole each. The liquid was stirred at 160 rpm with concurrent blow-in of nitrogen gas at a flow rate of 400 ml/min and reaction was continued with refluxing at 320° C. for 3.5 hr, whereby there was obtained a suspension containing precipitated fine particles of FePt. The FePt particles were stuck together. The suspension consisted of an organic medium (A) composed mainly of tetraethylene glycol (TEG) in which a mass of FePt nanoparticles (P) was present with the particles joined together (in a coherent state). This suspension will be designated (A+P).

The obtained suspension (A+P) was added with oleic acid and oleylamine as dispersant (surface active agent; organic medium C) in amounts to make the mole concentration of each four fold that of the total amount of metal in the suspension, whereafter the suspension was stirred for 1 hr at 80° C. and then shaken for 10 hr at a frequency of 5 Hz and stroke of 2 cm. By this there was obtained a suspension (A+P+C).

Separately, oleic acid and oleylamine (organic medium C) were added to 100 ml of cyclohexane (organic medium B) in the same amounts as the case of the suspension above hand totally dissolved under stirring to afford liquid (B+C).

The (A+P+C) suspension, 35 ml, and the (B+C) liquid, 35 ml, were joined in a container and shaken for 10 hr at a frequency of 5 Hz and stroke of 2 cm. The mixture obtained was left to stand and then centrifuged to phase-separate it into a phase A composed mainly of the liquid A and a phase B composed mainly of the liquid B. The phase A and phase B were fractionated. A large number of fine FePt particles were observed to be suspended in the liquid of the fractionated phase B.

The phase B, 35 ml, and pure water, 35 ml, were joined in a container and shaken for 10 hr at a frequency of 5 Hz and stroke of 2 cm. The mixture obtained was left to stand and then centrifuged to phase-separate it into a phase W composed mainly of water and a phase B' composed mainly of liquid B. The phase W and phase B' were fractionated. Fine FePt particles were observed to be suspended in the phase B'.

The obtained phase B' was observed with a transmission electron microscope (TEM). The phase B' was prepared for the TEM observation by applying it to a substrate and then allowing it to dry naturally. As determined by TEM observation, the average particle diameter was 5.2 nm, the standard deviation was 1.0 nm, and the average inter-particle interval was 3.3 nm. The geometrical average particle diameter was 5.1 and the geometrical standard deviation was 1.2. The transmission electron micrograph of FIG. 1 shows this state. As can be seen in FIG. 1, the particles are dispersed at substantially equal intervals to form a single-layer film extending two-dimensionally. From this it can be concluded that the particle surfaces are uniformly coated with the surface active agent to produce a steric repulsion (steric hindrance effect).

The particle concentration of the phase B' was $7.85 \times 10^{-4}$ wt % and the total concentration of the FePt nanoparticle aggregate, cyclohexane and surface active agent was 99.5%. The balance accounted for by impurities was therefore 0.5 wt % or less. The average particle diameter measured by the dynamic light scattering method was 5 nm.

Analysis of the FePt particle composition by EDX showed the ratio of Fe to Pt to be 59:41. When the particles were subjected to Fe Mossbauer spectroscopy, a spectrum corresponding to the ferromagnetism order of $L1_0$ ordered phase was observed at room temperature and the intensity of the $L1_0$ ordered phase obtained by fitting was 52 vol %. By measurement using a SQUID magnetometer, the coercivity Hc was found to be 125 kA/m and the saturation magnetization σs to be 51 $Am^2/kg$. The crystal structure transition starting temperature Tt determined by differential scanning calorimeter (DSC) measurement was 300° C.

Example 2

Example 1 was repeated except that the surface active agent (organic medium C) added to the cyclohexane side in Example 1 was instead all added to the (A+P+C) suspension side. In other words, an (A+P+2C) suspension was produced by the same method as in Example 1. The (A+P+2C) suspension, 35 ml, and the cyclohexane (organic medium B), 35 ml, were joined in a container and shaken for 10 hr at a frequency of 3 Hz and stroke of 10 cm, whereafter the process of Example 1 was repeated to obtain a phase B'. The obtained phase B' was not substantially different from that of Example 1.

Example 3

Suspension (A+P+C) was obtained in the same manner as in Example 1, except the stirring for 1 hr at 80° C. was omitted. As in Example 1, the (B+C) liquid was added to the (A+P+C) suspension, whereafter the process of Example 1 was repeated to obtain a phase B'. The obtained phase B' was not substantially different from that of Example 1.

Example 4

Suspension (A+P+2C) was obtained in the same manner as in Example 1, except that the surface-active agent (organic medium C) was added only to the (A+P+C) suspension side and the stirring for 1 hr at 80° C. was omitted. The (A+P+2C) suspension (35 ml) and the cyclohexane (organic medium B), (35 ml) were joined in a container and shaken for 10 hrs at a frequency of 3 Hz and stroke of 10 cm, thereafter the process of Example 1 was repeated to obtain a phase B'. The phase B' thus was not substantially different from that of Example 1.

Example 5

Suspension (A+P) was prepared as in Example 1. As in Example 1, required amounts of oleic acid and oleylamine (organic medium C) were added to make the mole concentration of each four fold than that of the total amount of metal concentration in the suspension, thereafter the suspension was shaken for 5 hrs at a frequency of 3 Hz and stroke of 10 cm, exposed to an ultrasonic wave for 1 hr, and further shaken for 5 hrs at a frequency of 3 Hz and stroke of 10 cm, thereby preparing an (A+P+C) suspension. As in Example 1, the (A+P+C) suspension was mixed with (B+C), thereafter the process in Example 1 was repeated to obtain a phase B'. The obtained phase B' was not substantially different from that of Example 1.

Example 6

An ultrasonically treated (A+P+2C) suspension was obtained in the same manner as in Example 5, except that the surface-active agent (organic medium C) was added only to the (A+P+C) suspension side. The as-obtained (A+P+C) suspension (35 ml) and the cyclohexane (organic medium B) (35 ml) were joined in a container and shaken for 10 hrs at a frequency of 3 Hz and stroke of 10 cm, whereafter the process of Example 1 was repeated to obtain a phase B'. The obtained phase B' was not substantially different from that of Example 1.

Comparative Example 1

Iron (III) acetylacetonate and platinum (II) acetylacetonate were added to 100 ml of tetraethylene glycol in an amount of 0.13 mmole each. The liquid was stirred at 160 rpm with concurrent blow-in of nitrogen gas at a flow rate of 400 ml/min and reaction was continued with refluxing at 320° C. for 3.5 hr, whereby there was obtained a suspension containing precipitated fine particles of FePt. 100 ml of the obtained suspension was added with 400 g of methanol and batched off into a bottle of Japanese regulation No.5, whereafter it was subjected to a separation operation for 2 hr at 3000 rpm using a small cooled centrifuge (rotor-type RT3S3 manufactured by Hitachi Kouki Co., Ltd). A supernatant and a sediment were obtained.

Figure 2:
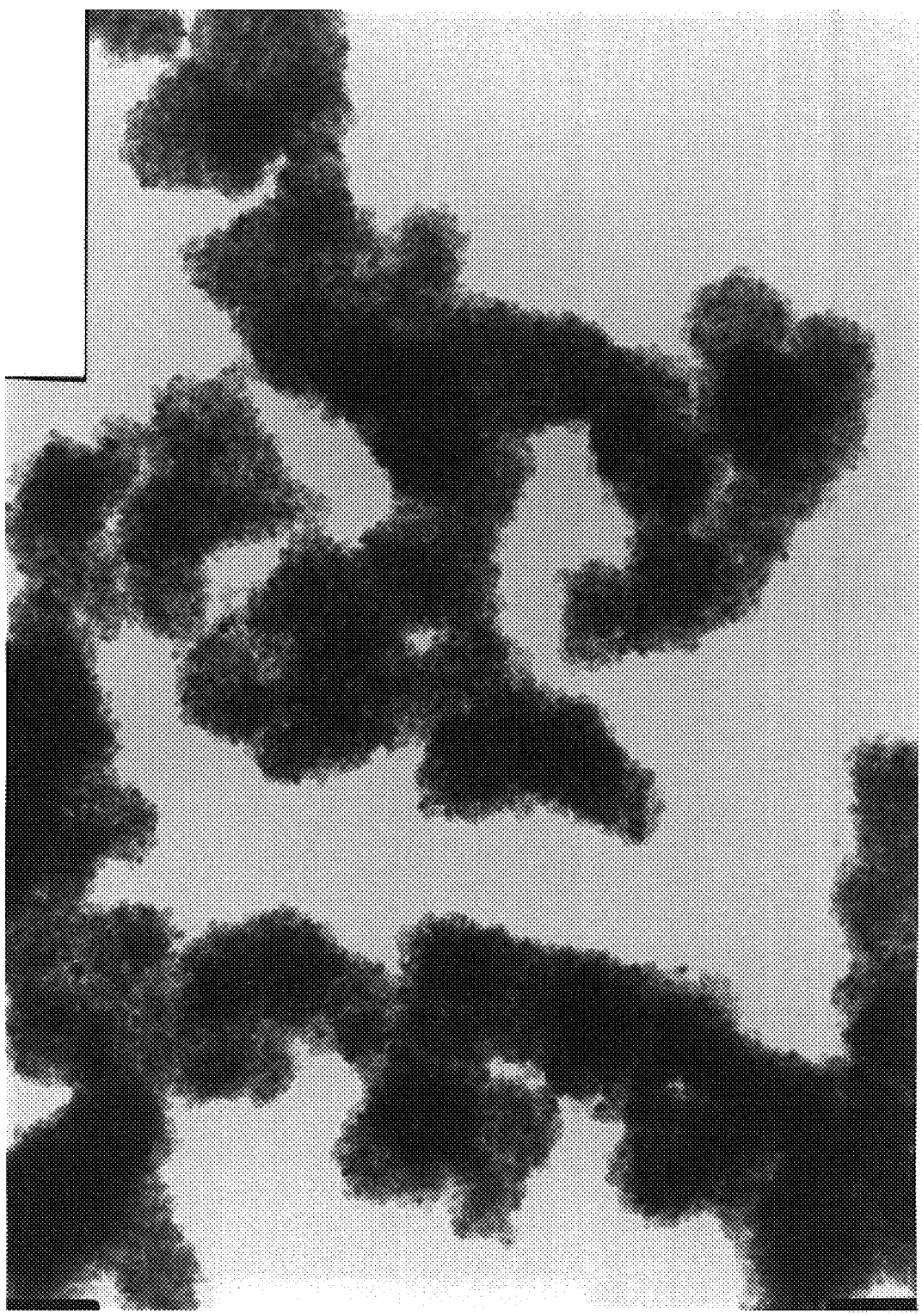
FIG. 2 shows a transmission electron micrograph (×300,000) of an FePt nanoparticle agglutinated state according to a comparative example.

After discarding the supernatant, 30 ml of methanol was added to the bottle and the result was dispersed for 30 min in an ultrasonic washer. During the dispersion, the bottom of the bottle was occasionally scraped with a spoon to confirm that no sediment was adhered to the bottom. The obtained suspension was treated for 30 min at 3000 rpm in the same centrifuge to obtain a supernatant and a sediment. The same process was repeated once more to obtain a sediment of FePt particles. FIG. 2 is a transmission electron micrograph of the FePt particle aggregate obtained in this manner. As can be seen, the FePt particles were markedly cohered.

Comparative Example 2

Iron (III) acetylacetonate and platinum (II) acetylacetonate were added to 100 ml of tetraethylene glycol in an amount of 0.13 mmole each. The liquid was stirred at 160 rpm with concurrent blow-in of nitrogen gas at a flow rate of 400 ml/min and reaction was continued with refluxing at 320° C. for 3.5 hr, whereby there was obtained a suspension containing precipitated fine particles of FePt. The fine particles of FePt were stuck together.

100 ml of the as-obtained suspension was batched off into a bottle of Japanese regulation No.5, whereafter it was subjected to a separation operation for 2 hr at 3000 rpm using a small cooled centrifuge (rotor-type RT3S3 manufactured by Hitachi Kouki Co., Ltd. Almost no sediment was obtained.

What is claimed:

1. A magnetic metal particle aggregate whose main components and the contents thereof are represented by the following general formula (1):

$$[T_X M_{1-X}]_Y Z_{1-Y} \quad (1),$$

where

T is one or both of Fe and Co,

M is one or both of Pt and Pd,

Z is at least one member selected from the group composed of Ag, Cu, Bi, Sb, Pb and Sn, X represents 0.3~0.7, and Y represents 0.7~1.0, the balance being impurities unavoidably incorporated during production, wherein the proportion of face-centered tetragonal structure is in the range of 10~100%, the particles have an average diameter of 30 nm or less, and wherein the particles are in a dispersed state spaced apart from one another, the magnetic metal particle aggregate has overall fluidity, and the particle surfaces are coated with a surface-active agent.

2. The magnetic metal particle aggregate according to claim 1, wherein the particles have an average diameter of 10 nm or less and are in a dispersed state spaced apart by an inter-particle distance of 1 nm or greater.

3. The magnetic metal particle aggregate according to claim 1, wherein the particles are in a state in which cohesion of particles is suppressed by an inter-particle repulsive force.

4. The magnetic metal particle aggregate according to claim 1, wherein the crystal structure transition temperature (Tt) thereof is 400° C. or lower.

5. The magnetic metal particle aggregate according to claim 1, wherein the magnetic metal particles are dispersed in a medium at an inter-particle distance of 1 nm or greater, the concentration of the magnetic metal particles in the dispersion medium is not less than $1.0 \times 10^{-5}$ vol. % and not greater than 40 vol. %, and the average particle diameter of the magnetic metal particles by the dynamic light scattering method is 30 nm or less.

6. The magnetic metal particle aggregate according to claim 5, wherein the dispersion medium comprises surface active agent and organic liquid whose water solubility is less than 1 wt. % and boiling point is less than 100° C., wherein the surface-active agent comprises an organic compound having at least one radical selected from the group consisting of amine, amide, azo, carboxyl, sulfone, sulfine, phosphone, phosphine, carboxylate, phosphonate, phosphinate, sulfonate, sulfinate and thiol radical.

7. The magnetic metal particle aggregate according to the claim 6, wherein the balance, aside from the organic liquid whose water solubility is less than 1 wt. % and its boiling point is less than 100° C., the surface-active agent and the magnetic metal particles, accounted for impurities and was not greater than 1.0 wt. %.

8. The magnetic metal particle aggregate according to claim 1, wherein the particles are distributed on the surface of a substrate in a monolayer or multiple layers and spaced 1 nm or greater apart.

9. The magnetic metal particle aggregate according to claim 1, wherein the particles have a saturation magnetization $\sigma_S$ of 5 $Am^2/kg$-96.16 $Am^2/kg$.

10. The magnetic metal particle aggregate according to claim 1, wherein the particles have a coercivity $H_c$ of 79 kA/m-3820 kA/m.

* * * * *